US009960845B2

(12) United States Patent
Ngo et al.

(10) Patent No.: US 9,960,845 B2
(45) Date of Patent: May 1, 2018

(54) IN-BAND OPTICAL-LINK MONITORING FOR A WDM NETWORK

(71) Applicant: Alcatel-Lucent USA Inc., Murray Hill, NJ (US)

(72) Inventors: Dat D. Ngo, Howell, NJ (US); Jonathan Nagel, Freehold, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days. days.

(21) Appl. No.: 15/198,532

(22) Filed: Jun. 30, 2016

(65) Prior Publication Data
US 2018/0006722 A1    Jan. 4, 2018

(51) Int. Cl.
*H04B 10/08*    (2006.01)
*H04B 10/079*    (2013.01)
(Continued)

(52) U.S. Cl.
CPC ..... *H04B 10/07957* (2013.01); *H04B 10/071* (2013.01); *H04B 10/25* (2013.01);
(Continued)

(58) Field of Classification Search
CPC .... H04B 10/071; H04B 10/40; H04B 10/035; H04B 10/07; H04B 10/0795;
(Continued)

(56) References Cited

U.S. PATENT DOCUMENTS 4,968,880 A    11/1990 Beller
5,000,568 A    3/1991 Trunta, Jr. et al.
(Continued)

FOREIGN PATENT DOCUMENTS

EP    0269448 A2    6/1988

OTHER PUBLICATIONS

Hill, Kent B., et al., "POTDR Measurements on Buried Optical Fibers," Technical Report, Naval Research Laboratory, NRL/MR5620-99-8195, 1998, (22 pages).
(Continued)

*Primary Examiner* — Hibret Woldekidan
(74) *Attorney, Agent, or Firm* — Mendelsohn Dunleavy, P.C.; Yuri Gruzdkov

(57) ABSTRACT

We disclose embodiments of a WDM transmitter having an in-band OTDR capability for at least a subset of the WDM channels thereof. In an example embodiment, an OTDR-enabled WDM channel of the WDM transmitter is implemented using an optical transceiver that comprises an optical transmitter and a coherent optical receiver. The optical transmitter is configured to generate a modulated optical signal by modulating a respective carrier wavelength, transmit the modulated optical signal through an optical link as a component of the corresponding WDM signal, and provide the respective carrier wavelength to the coherent optical receiver for being used therein as an optical local oscillator. The optical receiver is configured to estimate an impulse response of the optical link by coherently detecting and processing a return optical signal produced within the optical link due to distributed reflection and/or backscattering of the modulated optical signal.

27 Claims, 4 Drawing Sheets

(51) Int. Cl.
*H04J 14/02* (2006.01)
*H04B 10/071* (2013.01)
*H04B 10/25* (2013.01)
*H04B 10/40* (2013.01)
*H04B 10/516* (2013.01)
*H04L 5/00* (2006.01)
*H04J 14/06* (2006.01)

(52) U.S. Cl.
CPC ........... *H04B 10/40* (2013.01); *H04B 10/516* (2013.01); *H04J 14/0227* (2013.01); *H04J 14/06* (2013.01); *H04L 5/0044* (2013.01)

(58) Field of Classification Search
CPC ............ H04B 10/0799; H04B 10/2503; H04B 10/2916; H04B 10/07957; H04B 10/25; H04B 10/516; H04B 10/0731; H04B 10/0775; H04J 14/0278; H04J 14/0227; H04J 14/06; G01M 11/3127; G01M 11/3136; G01M 11/319; G01M 11/3109; G01M 11/3181; H04L 5/0044; G01D 5/35364
USPC ..... 398/25, 34, 36, 79, 135–139, 35, 65, 75, 398/152, 184, 188
See application file for complete search history.

(56) References Cited

U.S. PATENT DOCUMENTS

| | | | |
|---|---|---|---|
| 5,570,217 A * | 10/1996 | Fleuren | H04B 10/07 356/73.1 |
| 7,471,895 B2 * | 12/2008 | Nagel | H04B 10/071 398/11 |
| 7,747,177 B2 | 6/2010 | Chen et al. | |
| 8,073,345 B2 | 12/2011 | Chen et al. | |
| 8,280,253 B2 | 10/2012 | Genay et al. | |
| 8,285,138 B2 * | 10/2012 | Lewin | G06E 3/00 398/16 |
| 8,502,964 B2 | 8/2013 | Wang et al. | |
| 8,581,778 B2 * | 11/2013 | Sankar | G01S 13/282 342/128 |
| 8,588,565 B2 | 11/2013 | Doerr | |
| 8,693,866 B1 * | 4/2014 | Lam | H04B 10/071 398/13 |
| 8,805,183 B2 | 8/2014 | Dvir | |
| 8,837,938 B2 | 9/2014 | Liu et al. | |
| 8,942,556 B2 | 1/2015 | Zhao et al. | |
| 9,008,503 B2 | 4/2015 | Urban et al. | |
| 9,020,364 B2 | 4/2015 | Xie et al. | |
| 9,024,806 B2 * | 5/2015 | Hemmendorff | G01S 7/28 342/118 |
| 9,036,991 B2 | 5/2015 | Aguren | |
| 9,042,721 B2 | 5/2015 | Randel et al. | |
| 9,112,614 B2 | 8/2015 | Randel et al. | |
| 9,143,228 B2 | 9/2015 | Sandstrom | |
| 9,170,173 B2 | 10/2015 | Perron et al. | |
| 9,203,682 B2 | 12/2015 | Winzer et al. | |
| 9,209,898 B1 * | 12/2015 | Schemmann | H04B 10/299 |
| 9,240,836 B1 | 1/2016 | Chen | |
| 9,294,146 B2 * | 3/2016 | Mumtaz | H04B 10/2581 |
| 9,310,274 B2 | 4/2016 | Nagel et al. | |
| 9,341,543 B2 | 5/2016 | Viswanathan | |
| 9,614,616 B2 * | 4/2017 | Joffe | H04B 10/2507 |
| 9,831,943 B2 * | 11/2017 | Webb | H04B 10/071 |
| 2007/0036545 A1 * | 2/2007 | Lautenschlager | H04B 10/071 398/33 |
| 2010/0098413 A1 * | 4/2010 | Li | H04B 10/0795 398/38 |
| 2010/0158521 A1 | 6/2010 | Doerr et al. | |
| 2010/0202780 A1 * | 8/2010 | Tortelier | H03M 13/356 398/118 |
| 2010/0215368 A1 * | 8/2010 | Qian | H04J 14/0282 398/67 |
| 2011/0038631 A1 | 2/2011 | Doerr | |
| 2011/0216996 A1 | 9/2011 | Rogers | |
| 2013/0142512 A1 * | 6/2013 | Cheng | H04B 10/501 398/66 |
| 2013/0216176 A1 | 8/2013 | Li et al. | |
| 2013/0251363 A1 * | 9/2013 | Joffe | H04B 10/071 398/28 |
| 2013/0272698 A1 * | 10/2013 | Jin | H04L 27/2628 398/43 |
| 2014/0078506 A1 * | 3/2014 | Hu | G01M 11/3118 356/445 |
| 2014/0212130 A1 | 7/2014 | Urban et al. | |
| 2015/0016816 A1 * | 1/2015 | Piehler | H04B 10/071 398/10 |
| 2015/0372764 A1 | 12/2015 | Kaneda | |
| 2017/0343750 A1 * | 11/2017 | Ashrafi | G02B 6/43 |

OTHER PUBLICATIONS

Bao, Xiaoyi and Chen, Liang, "Recent Progress in Distributed Fiber Optic Sensors," Sensors, 2012, vol. 12, pp. 8601-8639.

"Spectral Grids for WDM Applications: DWDM Frequency Grid," www.itu.int, year [retrieved on Jun. 10, 2016] Retrieved from the Internet: <URL: https://www.itu.int/rec/dologin_pub.asp?lang=e&id=T-REC-G.694.1-201202-I!!PDF-E&type=items> (16 pages).

* cited by examiner

270

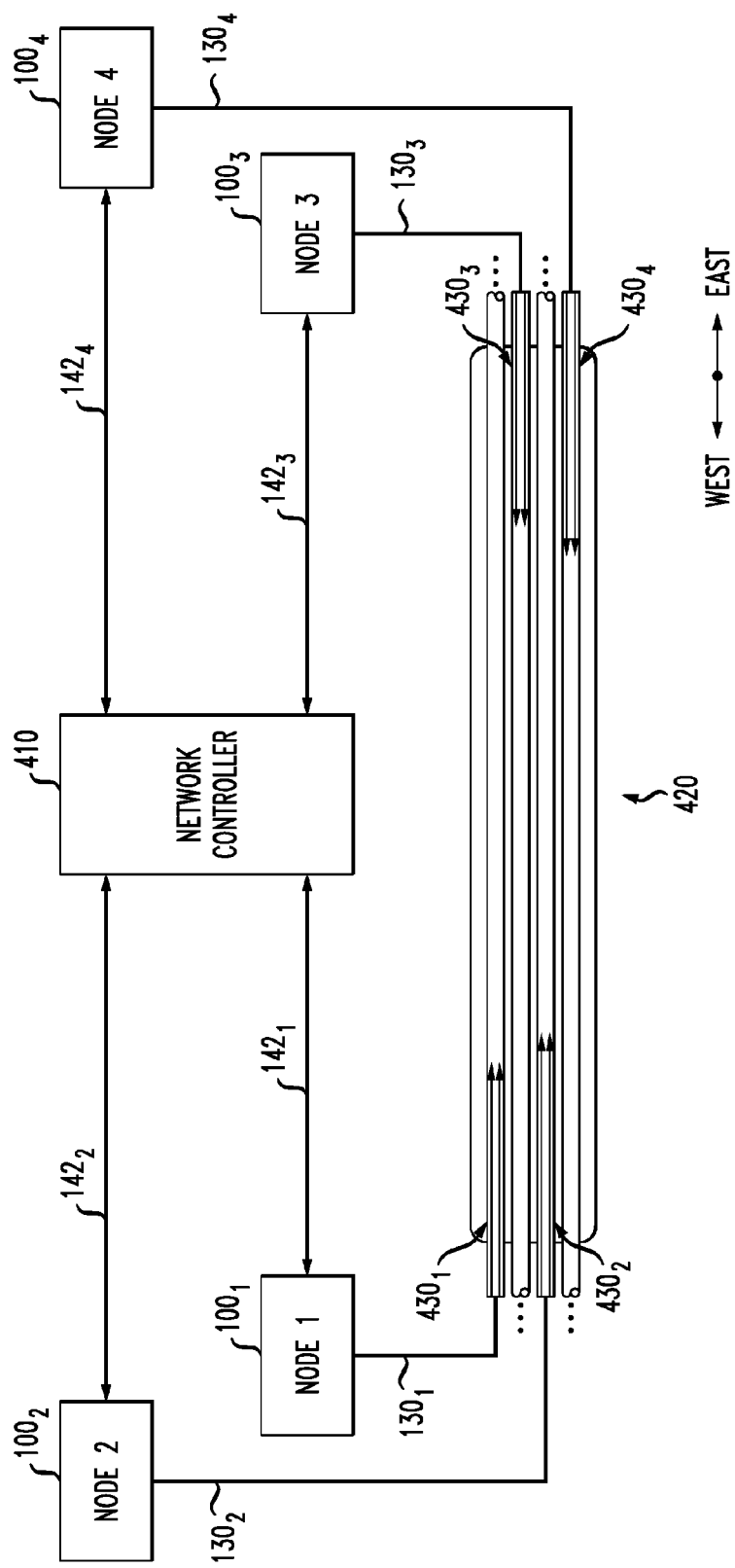

US 9,960,845 B2

IN-BAND OPTICAL-LINK MONITORING FOR A WDM NETWORK

BACKGROUND

Field

The present disclosure relates to optical communication equipment and, more specifically but not exclusively, to wavelength-division-multiplexing (WDM) networks that use reflectometry for optical-link monitoring.

Description of the Related Art

This section introduces aspects that may help facilitate a better understanding of the disclosure. Accordingly, the statements of this section are to be read in this light and are not to be understood as admissions about what is in the prior art or what is not in the prior art.

A time-domain (TD) reflectometer is an instrument that is designed to characterize the impulse response of an object, device, or system under test. Example applications that rely on TD reflectometers include but are not limited to fault diagnostics for coaxial cables and optical channels, integrity tests for printed circuit boards, waveguides, and wiring systems, detection of leaks in ducts and pipelines, and medical diagnostics of bodily cavities. An example optical TD reflectometer (OTDR) operates by firing an optical pulse into an optical line under test and then recording one or more reflections of this pulse from one or more defects (if any) and/or imperfections along the length of the optical line. More specifically, the optical pulse may undergo partial reflection and partial transmission at each defect/imperfection, thereby creating reflected optical signals. These reflected optical signals travel back to the reflectometer to be detected and processed to estimate the location(s) and possibly other observable characteristics of the defect(s) and imperfections.

SUMMARY OF SOME SPECIFIC EMBODIMENTS

Disclosed herein are various embodiments of a WDM transmitter having an in-band OTDR capability for at least a subset of the WDM channels thereof. In an example embodiment, an OTDR-enabled WDM channel of the WDM transmitter is implemented using an optical transceiver that comprises an optical transmitter and a coherent optical receiver. The optical transmitter is configured to generate a modulated optical signal by modulating a respective carrier wavelength, transmit the modulated optical signal through an optical link as a component of the corresponding WDM signal, and provide the respective carrier wavelength to the coherent optical receiver for being used therein as an optical local oscillator. The optical receiver is configured to estimate an impulse response of the optical link by coherently detecting and processing a return optical signal produced within the optical link due to distributed reflection and/or backscattering of the modulated optical signal. Embodiments of the disclosed WDM transmitter can advantageously be used to monitor optical links of the corresponding optical network with significantly better accuracy, higher level of detail, and/or a wider set of detectable defects and imperfections than those attainable with conventional OTDR methods.

According to an example embodiment, provided is an apparatus comprising: a first transceiver configured to generate a first modulated optical signal having a first carrier wavelength; a second transceiver configured to generate a second modulated optical signal having a different second carrier wavelength; and an optical multiplexer configured to multiplex the first modulated optical signal and the second modulated optical signal to generate a first WDM signal; wherein the apparatus is capable of transmitting the first WDM signal to a first optical link and receiving back from the first optical link a second WDM signal; wherein the optical multiplexer is further configured to demultiplex the second WDM signal to generate a first return optical signal and a second return optical signal; wherein the first transceiver is further configured to determine a first correlation, the first correlation being a correlation between the first modulated optical signal and the first return optical signal; and wherein the second transceiver is further configured to determine a second correlation, the second correlation being a correlation between the second modulated optical signal and the second return optical signal.

BRIEF DESCRIPTION OF THE DRAWINGS

Other aspects, features, and benefits of various disclosed embodiments will become more fully apparent, by way of example, from the following detailed description and the accompanying drawings, in which:

FIG. 4 shows a block diagram of an optical transport network having one or more of the network nodes of FIG. 1 according to an embodiment.

DETAILED DESCRIPTION

Figure 1:
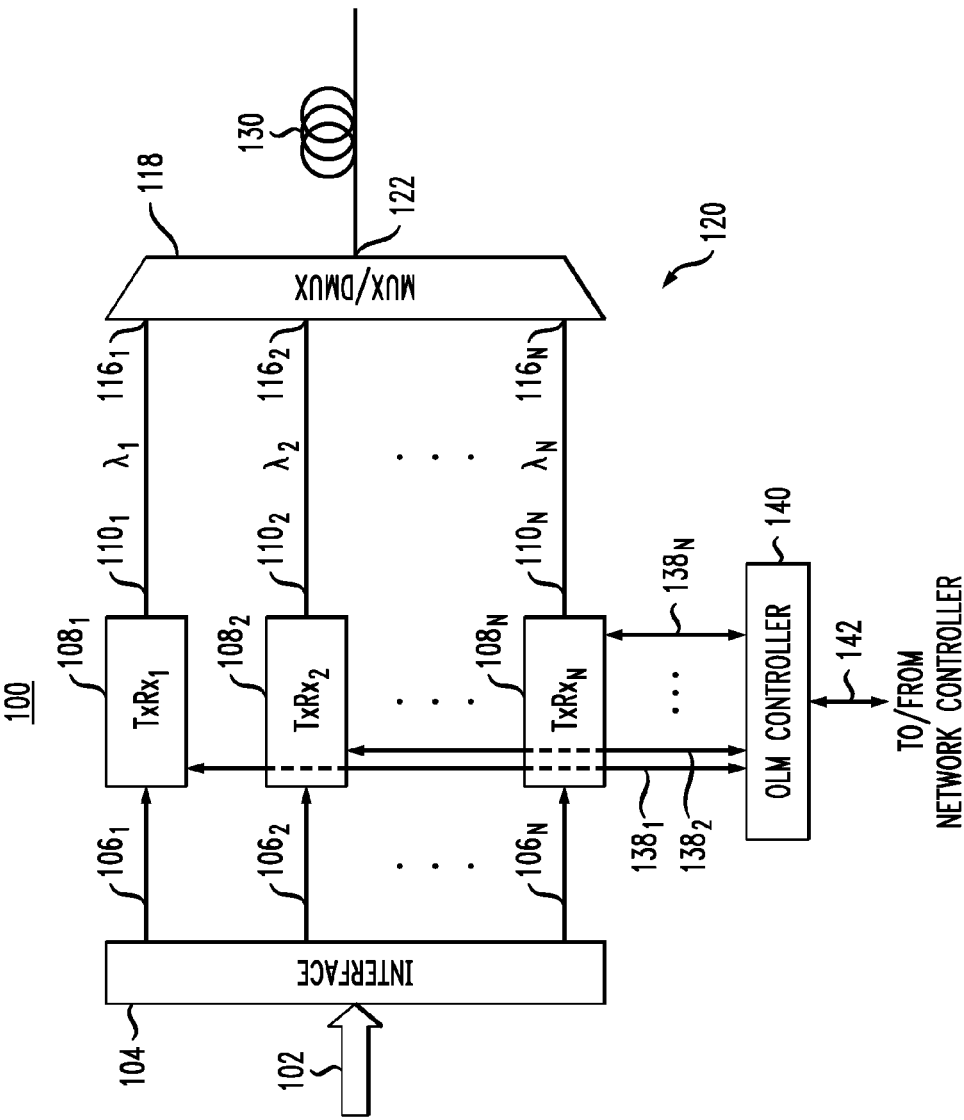
FIG. 1 shows a block diagram of a network node according to an embodiment.

FIG. 1 shows a block diagram of a network node 100 according to an embodiment.

Node 100 comprises a WDM transmitter 120 coupled to an optical link (e.g., comprising an optical fiber and/or fiber-optic cable) 130 to transmit therethrough (e.g., to a remote receiver, not explicitly shown in FIG. 1) WDM optical communication signals having encoded thereon payload data 102 received by the WDM transmitter from external circuits or devices (not explicitly shown in FIG. 1). In some embodiments, node 100 may also include a WDM receiver (not explicitly shown in FIG. 1). As used herein, the term "WDM" should be construed to encompass conventional WDM, dense WDM (DWDM), orthogonal frequency-division-multiplexing (OFDM), and optical super-channel embodiments. In an example embodiment, node 100 can be a part of an optical transport network having a network controller that can control certain functions of node 100, e.g., by way of a control signal 142 (also see FIG. 4).

WDM transmitter 120 comprises an input interface 104 that operates to partition payload data 102 into a plurality of data streams $106_1$-$106_N$ for transmission over different respective WDM channels of node 100, where N is a positive integer greater than one. Each WDM channel uses a corresponding one of carrier wavelengths $\lambda_1, \lambda_2, \ldots, \lambda_N$ that can be selected, e.g., in accordance with a frequency grid defined in Recommendation ITU-T G.694.1, which is incorporated herein by reference in its entirety. In an example embodiment, the number N can be in the range between approximately ten and approximately one hundred.

WDM transmitter 120 further comprises transceivers $108_1$-$108_N$, each configured to receive a respective one of data streams $106_1$-$106_N$ from input interface 104 as indicated in FIG. 1. In operation, transceiver $108_i$ (where i=1, 2, ..., N) uses an operative constellation to convert the received data stream $106_i$ into a corresponding modulated optical signal having the carrier wavelength $\lambda_i$. In various embodiments, the operative constellation can be a QAM (Quadrature Amplitude Modulation) constellation, a QPSK (Quadrature Phase Shift Keying) constellation, a PAM (Pulse-Amplitude Modulation) constellation, or any other suitable constellation. In some embodiments, a modulated optical signal generated by transceiver $108_i$ can be polarization-multiplexed, e.g., as described in more detail below in reference to FIG. 2.

Each of transceivers $108_1$-$108_N$ applies the modulated optical signal that it generates to a respective one of optical waveguides or fibers $110_1$-$110_N$ that further applies that modulated optical signal to an optical multiplexer/demultiplexer (MUX/DMUX) 118. In an example embodiment, MUX/DMUX 118 has (i) N plural ports $116_1$-$116_N$, each directly connected to a respective one of optical waveguides or fibers $110_1$-$110_N$, and (ii) a single common port 122 that is directly connected to optical link 130, e.g., as indicated in FIG. 1. MUX/DMUX 118 operates as (i) a wavelength multiplexer for optical signals that traverse it in the direction from plural ports $116_1$-$116_N$ to common port 122 and (ii) a wavelength demultiplexer for optical signals that traverse it in the opposite direction, i.e., from common port 122 to plural ports $116_1$-$116_N$. In an example embodiment, MUX/DMUX 118 can be implemented, as known in the art, using an arrayed waveguide grating (AWG).

Some or all of transceivers $108_1$-$108_N$ may differ from transmitter modules that are conventionally employed in WDM transmitters in that each of these transceivers incorporates additional components that enable WDM transmitter 120 to perform optical-link monitoring (OLM) functions, e.g., as further described below. More specifically, such additional components provide the corresponding transceiver $108_i$ with an in-band OTDR capability that can be used to monitor certain characteristics of optical link 130 corresponding to carrier wavelength $\lambda_i$. The subset of transceivers $108_1$-$108_N$ having such in-band OTDR capabilities therefore operate to provide OLM data in a spectrally diverse manner, at multiple wavelengths of the set ($\lambda_1$, $\lambda_2$, ..., $\lambda_N$) used by WDM transmitter 120. An example embodiment of transceiver $108_i$ is described in more detail below in reference to FIGS. 2-3.

For comparison, a conventional network node having an OTDR capability typically operates to provide OLM data at a single out-of-band wavelength. For example, the optical transmitter of such a conventional network node may transmit payload data using a carrier wavelength of ca. 1550 nm, whereas the corresponding OTDR function is carried out using the probe light whose wavelength may be ca. 1610 nm. The latter wavelength is referred to as being "out-of-band" because it is located outside the spectral band occupied by the modulated optical signal that carries payload data. A person of ordinary skill in the art will understand that this spectral band is approximately centered on the carrier wavelength and has a bandwidth corresponding to the modulation speed.

In contrast, the OTDR function of transceiver $108_i$ is carried out using wavelength $\lambda_i$, i.e., the same carrier wavelength that is used by this transceiver to transmit payload data. For this reason, transceiver $108_i$ is referred to herein as having an "in-band" OTDR capability. Furthermore, an example embodiment of WDM transmitter 120 has two or more transceivers $108_i$ that are OTDR-capable, which causes node 100 to have an OTDR capability for generating OLM data corresponding to multiple in-band wavelengths. This spectral diversity and the fact that the OLM wavelengths are located "in-band" (as opposed to "out-of-band") can be beneficially leveraged to achieve significant improvements in OLM results compared to those achieved using conventional OTDR-capable network nodes. A person of ordinary skill in the art will appreciate that possible OLM improvements can be in: (i) the accuracy with which the location of a defect or a vibrating section of the optical fiber is determined; (ii) temperature tracking of the optical fiber; (iii) the added ability to detect non-catastrophic defects that might be caused by sheering, stressing, shaking, and/or excessive bending of the optical fiber; etc.

Node 100 controls and coordinates the OTDR functions of different transceivers $108_i$ by way of control signals $138_i$ that are exchanged by individual transceivers $108_1$-$108_N$ and an electronic OLM controller 140. In some embodiments, OLM controller 140 may perform additional processing of the OTDR data collected by individual transceivers $108_1$-$108_N$, e.g., to combine OTDR data corresponding to different wavelengths of the WDM set ($\lambda_1$, $\lambda_2$, ..., $\lambda_N$) and to analyze the combined data for the presence of spectral features attributed to specific types of fiber defects and/or imperfections. OLM controller 140 may then report the findings, e.g., by way of control signal 142, to the network controller for possible further OAM (operations, administration, and management) action. An example OAM action can include but is not limited to scheduling a repair or maintenance operation on optical link 130 and/or rerouting the optical signals applied to the optical link to bypass a detected defect.

In some embodiments, transceiver $108_i$ can be designed to perform OTDR measurements in a normal operating mode, e.g., by detecting and processing reflected and/or backscattered optical signals corresponding to the modulated optical signal that the transceiver generates and applies to optical waveguide or fiber $110_i$ to carry payload data, e.g., a portion of data stream $106_i$. Alternatively or in addition, transceiver $108_i$ can be designed and configured to perform OTDR measurements in a special OLM operating mode, during which the transceiver generates and applies to optical waveguide or fiber $110_i$ a modulated optical signal with a waveform that facilitates OTDR measurements, e.g., in terms of providing a higher signal-to-noise ratio (SNR) and/or a better spatial resolution for OTDR measurements than those technically achievable with payload-carrying optical signals. Transmission of payload data is temporarily halted while transceiver $108_i$ is in the OLM operating mode and is resumed when the transceiver is switched back to the normal operating mode.

In different embodiments, transceiver $108_i$ can be designed to perform different types of OTDR measurements. For example, in one embodiment, transceiver $108_i$ can be designed to perform OTDR measurements by detecting and processing the elastically reflected light and/or backscattered light produced due to Rayleigh scattering in optical link 130. In an alternative embodiment, transceiver $108_i$ can be designed to perform OTDR measurements by detecting and processing the backscattered light produced due to Brillouin scattering in optical link 130. In another alternative embodiment, transceiver $108_i$ can be designed to perform OTDR measurements by detecting and processing the backscattered light produced due to Raman scattering in optical link 130. These and other alternative embodiments of transceiver $108_i$ may benefit from the use of at least some OTDR features and/or techniques disclosed, e.g., in U.S. Pat. Nos. 9,341,543, 9,310,274, 9,240,836, 9,170,173, 9,143,228, 9,042,721, 9,036,991, 9,008,503, 8,942,556, 8,837,938, 8,805,183, 8,502,964, and 8,280,253 and U.S. Patent Application Publication Nos. 2011/0216996, 2013/0216176, and 2014/0212130, all of which are incorporated herein by reference in their entirety. The general physical principles of different types of OTDR measurements are reviewed, e.g., in Xiaoyi Bao and Liang Chen, "Recent Progress in Distributed Fiber Optic Sensors," Sensors, 2012, vol. 12, pp. 8601-8639, which is also incorporated herein by reference in its entirety.

In some embodiments, the set of transceivers $108_1$-$108_N$ may include two or more transceivers that are designed and configured to perform different respective types of OTDR measurements. For example, in one possible embodiment, the set of transceivers $108_1$-$108_N$ may include (i) at least one transceiver that performs OTDR measurements by detecting and processing the elastically reflected light and/or backscattered light produced due to Rayleigh scattering in optical link 130; (ii) at least one transceiver that performs OTDR measurements by detecting and processing the backscattered light produced due to Brillouin scattering in optical link 130; and/or (iii) at least one transceiver that performs OTDR measurements by detecting and processing the backscattered light produced due to Raman scattering in optical link 130. A person of ordinary skill in the art will understand that other combinations are also possible.

Figure 2:
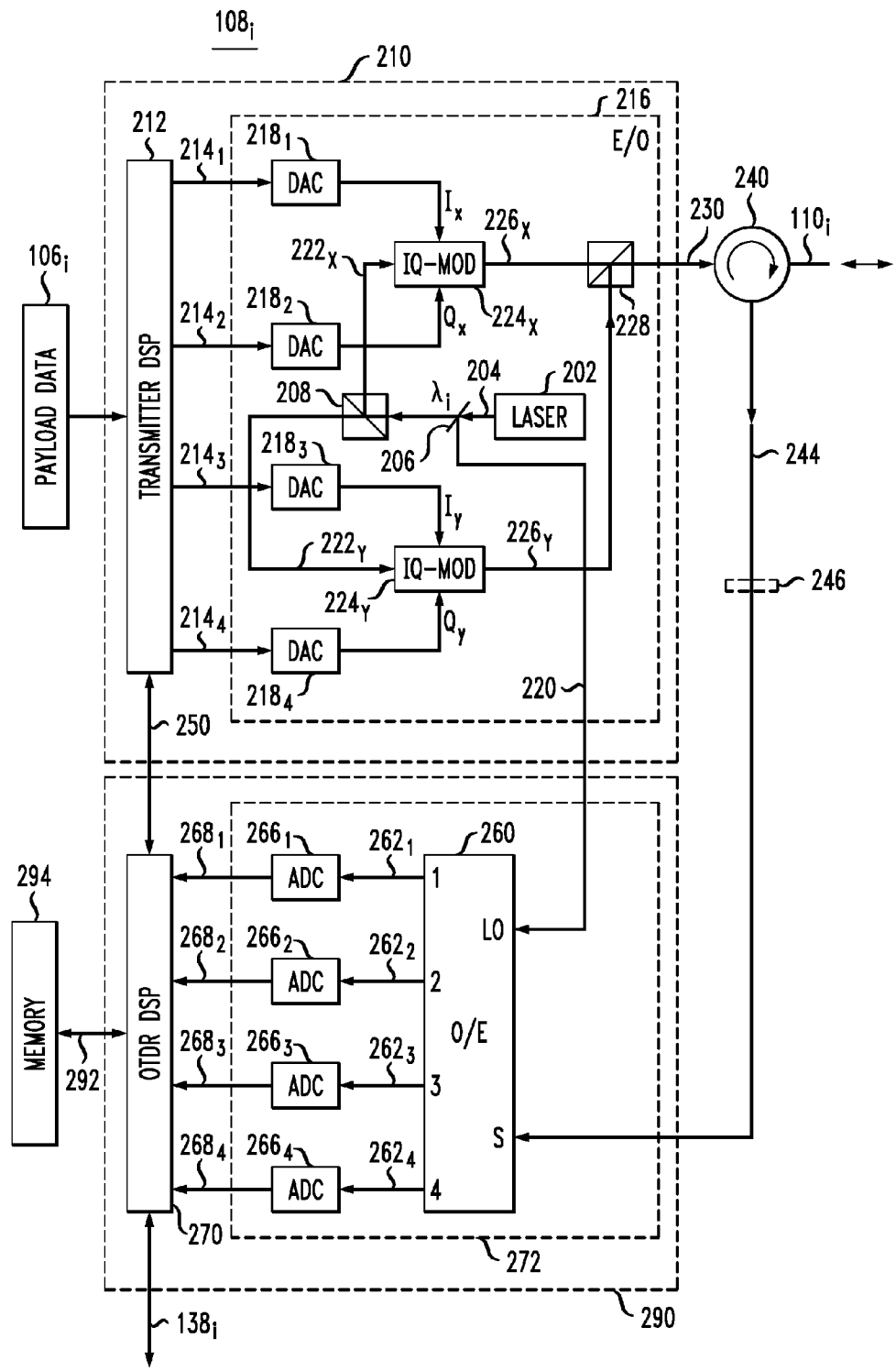
FIG. 2 shows a block diagram of a transceiver that can be used in the network node of FIG. 1 according to an embodiment.

FIG. 2 shows a block diagram of transceiver $108_i$ according to an embodiment. Data stream $106_i$, optical waveguide or fiber $110_i$, and control signal $138_i$ are also shown in FIG. 2 to more-clearly indicate the relationship between the block diagrams of FIGS. 1 and 2.

As indicated in FIG. 2, transceiver $108_i$ includes an optical transmitter 210 and an optical receiver 290, both of which are connected to optical waveguide or fiber $110_i$ by way of an optical circulator 240. In operation, optical circulator 240 applies a modulated optical signal 230 generated by optical transmitter 210 to optical waveguide or fiber $110_i$, which then causes that signal to be directed to optical link 130 as indicated in FIG. 1. While propagating through optical link 130, optical signal 230 undergoes partial reflection and/or backscattering via one or more of the optical processes mentioned above, thereby causing a return optical signal 244 to be directed back to transceiver $108_i$ through optical waveguide or fiber $110_i$. Optical circulator 240 then causes return optical signal 244 to be applied to optical receiver 290 as indicated in FIG. 2. In some embodiments, transceiver $108_i$ may include an optional optical filter 246 configured to stop, attenuate, and/or remove one or more unwanted spectral components (if any) of return optical signal 244 prior to applying the return optical signal to optical receiver 290.

Optical transmitter 210 has a coherent light source (e.g., laser) 202 that operates to generate a continuous carrier wave 204 of wavelength $\lambda_i$. A power splitter 206 and a polarization beam splitter 208 then split carrier wave 204 into three portions that are shown in FIG. 2 as optical signals 220, $222_X$, and $222_Y$, respectively. Optical signal 220 is applied to optical receiver 290 and is used therein as an optical local-oscillator (LO) signal. Optical signals $222_X$ and $222_Y$ are orthogonally polarized with respect to one another and have an X-polarization and a Y-polarization, respectively.

In a normal operating mode, optical transmitter 210 applies the received data stream $106_i$ to a digital signal processor (DSP) 212. DSP 212 processes data stream $106_i$ to generate electrical digital signals $214_1$-$214_4$. In each signaling interval, signals $214_1$ and $214_2$ carry digital values that represent the in-phase (I) component and quadrature (Q) component, respectively, of a corresponding constellation symbol intended for transmission using X-polarized light. Signals $214_3$ and $214_4$ similarly carry digital values that represent the I and Q components, respectively, of the corresponding constellation symbol intended for transmission using Y-polarized light.

An electrical-to-optical (E/O) converter 216 of optical transmitter 210 transforms digital signals $214_1$-$214_4$ into modulated optical signal 230 as follows. Digital-to-analog converters (DACs) $218_1$ and $218_2$ transform digital signals $214_1$ and $214_2$ into an analog form to generate electrical drive signals $I_X$ and $Q_X$, respectively. Electrical drive signals $I_X$ and $Q_X$ are then used, in a conventional manner, to drive an optical I-Q modulator $224_X$. In response to electrical drive signals $I_X$ and $Q_X$, optical I-Q modulator $224_X$ modulates X-polarized carrier wave $222_X$ received from polarization beam splitter 208, thereby generating an X-polarized modulated optical signal $226_X$. DACs $218_3$ and $218_4$ similarly transform digital signals $214_3$ and $214_4$ into an analog form to generate electrical drive signals $I_Y$ and $Q_Y$, respectively. In response to electrical drive signals $I_Y$ and $Q_Y$, an optical I-Q modulator $224_Y$ modulates Y-polarized carrier wave $222_Y$ received from polarization beam splitter 208, thereby generating a Y-polarized modulated optical signal $226_Y$. A polarization beam combiner 228 then combines modulated optical signals $226_X$ and $226_Y$ to generate modulated optical signal 230.

Optical receiver 290 includes a front-end circuit 272 that comprises an optical-to-electrical (O/E) converter 260 and analog-to-digital converters (ADCs) $266_1$-$266_4$. O/E converter 260 has (i) two input ports labeled LO and S and (ii) four output ports labeled 1 through 4. Input port S receives return optical signal 244 from optical circulator 240. Input port LO receives optical LO signal 220 from optical transmitter 216.

O/E converter 260 operates to optically mix return optical signal 244 and optical LO signal 220 to generate eight corresponding optical interference signals (not explicitly shown in FIG. 2). O/E converter 260 then converts the eight optical interference signals into four electrical signals $262_1$-$262_4$ that are indicative of the complex values corresponding to the two orthogonal-polarization components of return optical signal 244. For example, electrical signals $262_1$ and $262_2$ may be an analog in-phase signal and an analog quadrature signal, respectively, corresponding to the X-polarization component of return optical signal 244. Electrical signals $262_3$ and $262_4$ may similarly be an analog in-phase signal and an analog quadrature signal, respectively, corresponding to the Y-polarization component of return optical signal 244.

In an example embodiment, O/E converter 260 can be implemented using a polarization-diverse 90-degree optical hybrid with four balanced photo-detectors coupled to its eight output ports. Several O/E converters that can be used to implement O/E converter 260 are disclosed, e.g., in U.S. Patent Application Publication Nos. 2010/0158521 and 2011/0038631, and U.S. Pat. No. 8,588,565, all of which are incorporated herein by reference in their entirety.

Each of electrical signals $262_1$-$262_4$ generated by O/E converter 260 is converted into digital form in a corresponding one of ADCs $266_1$-$266_4$, which produces electrical digital signals $268_1$-$268_4$. Optionally, each of electrical signals $262_1$-$262_4$ may be amplified in a corresponding amplifier (not explicitly shown in FIG. 2) prior to the conversion into the digital form. An OTDR DSP 270 then appropriately processes electrical digital signals $268_1$-$268_4$ generated by ADCs $266_1$-$266_4$ to generate OLM data corresponding to wavelength $\lambda_i$. In an example embodiment, the generated OLM data may include data representing an estimated impulse response of optical link 130 (FIG. 1) to a probe-light pulse of wavelength $\lambda_i$. In different embodiments, the estimated impulse response of optical link 130 may correspond to one or more of elastic reflection, Rayleigh scattering, Brillouin scattering, and Raman scattering. As already indicated above, the OLM data generated by OTDR DSP 270 can be transferred to OLM controller 140 (FIG. 1) by way of control signal $138_i$.

In an example embodiment, the signal processing implemented in OTDR DSP 270 is directed at estimating the impulse response of optical link 130 by measuring a correlation function $F(\tau)$ that quantifies correlation between modulated optical signal 230 and return optical signal 244 as a function of relative delay time $\tau$. For this purpose, OTDR DSP 270 may receive from transmitter DSP 212, by way of an intra-node data bus 250, a copy of the sequence of constellation symbols that was used in the process of generating the corresponding modulated optical signal 230. An example chain of digital signal processing that can be used in OTDR DSP 270 is described in more detail below in reference to FIG. 3. Some embodiments of OTDR DSP 270 may benefit from the use of OTDR correlation methods disclosed in the above-cited U.S. Pat. No. 9,042,721.

In an OLM operating mode, OTDR DSP 270 can use intra-node data bus 250 to supply to transmitter DSP 212 a fixed sequence of constellation symbols to be used in the generation of modulated optical signal 230. In an example embodiment, such fixed sequence of constellation symbols may be based on a complex Golay sequence or code. In alternative embodiments, other suitable sequences or codes may also be used. Several suitable sequences and/or the corresponding sequences of constellation symbols intended for use during the OLM operating mode can be stored in a non-volatile memory 294 and retrieved therefrom, by OTDR DSP 270, by way of a data bus 292 as needed. In some embodiments, memory 294 can be a memory circuit or device that is external to transceiver $108_i$. Some embodiments of transceiver $108_i$ may benefit from the use of Golay-sequence-based OTDR methods disclosed, e.g., in European Patent Application Publication EP 0269448 A2 and U.S. Pat. Nos. 5,000,568 and 4,968,880, all of which are incorporated herein by reference in their entirety.

Figure 3:
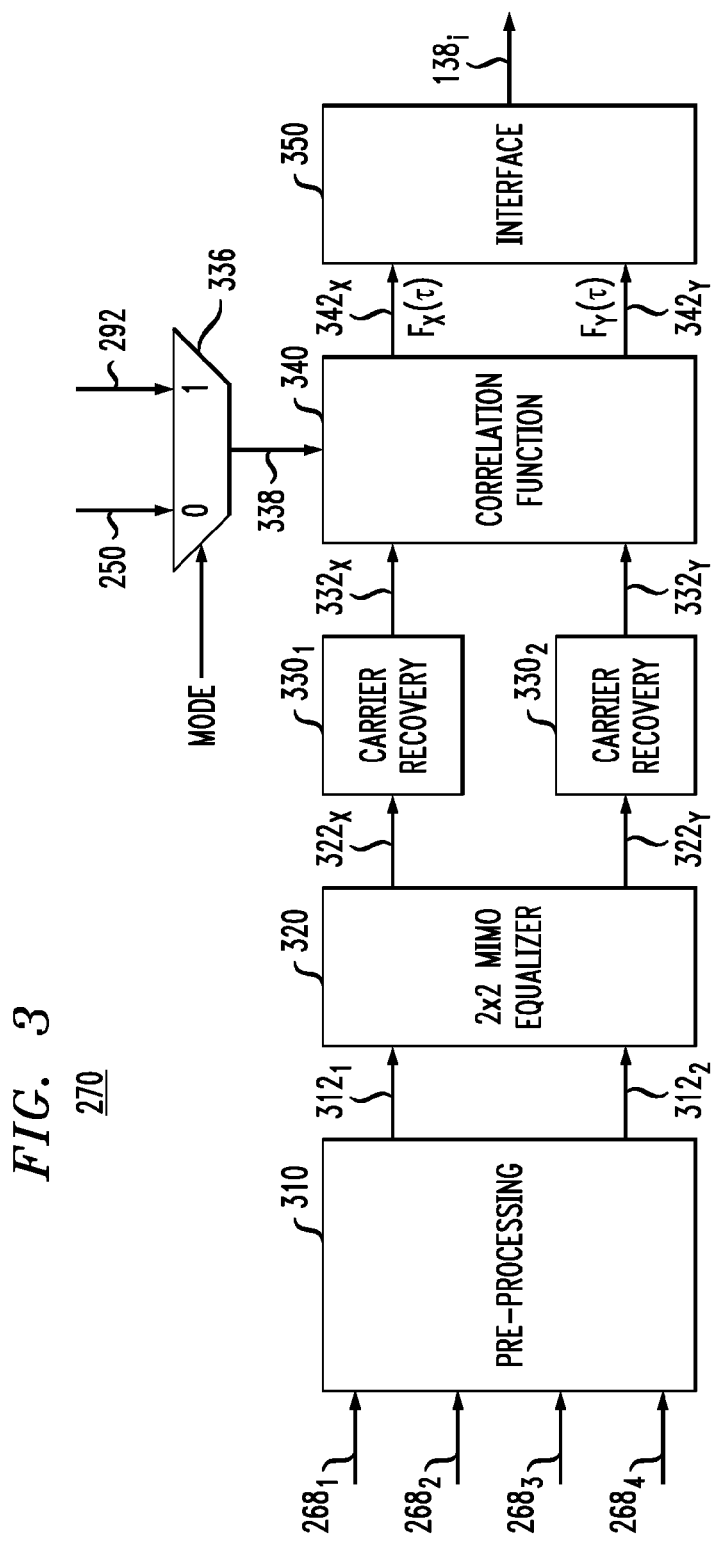
FIG. 3 shows a block diagram of a digital signal processor that can be used in the transceiver of FIG. 2 according to an embodiment.

FIG. 3 shows a block diagram of OTDR DSP 270 (FIG. 2) according to an embodiment. Electrical digital signals $268_1$-$268_4$, data buses 250 and 292, and control signal $138_i$ are also shown in FIG. 3 to more-clearly indicate the relationship between the block diagrams of FIGS. 2 and 3.

OTDR DSP 270 includes a signal-pre-processing module 310 configured to receive electrical digital signals $268_1$-$268_4$ (also see FIG. 2). One function of module 310 may be to adapt the signal samples received via electrical digital signals $268_1$-$268_4$ to a form suitable for the signal-processing algorithms used in the downstream modules of OTDR DSP 270. For example, module 310 may be configured to convert the signal samples received via digital signals $268_1$-$268_4$ into the corresponding complex-valued signal samples for digital signals $312_1$ and $312_2$.

In some embodiments, module 310 may optionally be configured to reduce signal distortions imposed by front-end circuit 272 (see FIG. 2). Such distortions can be caused, e.g., by incorrect biasing of various electro-optical components in O/E converter 260, imperfect signal splitting in power and polarization splitters and optical couplers, frequency dependence and variability of the O/E conversion characteristics of the photo-detectors, etc. Example signal-processing methods that can be implemented in module 310 for this purpose are disclosed, e.g., in U.S. Pat. No. 9,203,682, which is incorporated herein by reference in its entirety.

Complex-valued digital signals $312_1$ and $312_2$ are applied to a 2×2 MIMO (multiple-input/multiple-output) equalizer 320 for MIMO-equalization processing therein, and the resulting equalized signals are complex-valued digital signals $322_X$ and $322_Y$. In an example embodiment, equalizer 320 can be a butterfly equalizer configured to perform electronic polarization demultiplexing. In some embodiments, equalizer 320 can also perform additional signal processing, e.g., directed at reducing the adverse effects of certain signal impairments imposed by optical link 130. Example 2×2 MIMO equalizers that can be used as equalizer 320 are disclosed, e.g., in U.S. Pat. No. 9,020,364 and U.S. Patent Application Publication No. 2015/0372764, both of which are incorporated herein by reference in their entirety.

Digital signals $322_X$ and $322_Y$ generated by equalizer 320 are applied to carrier-recovery modules $330_1$ and $330_2$, respectively. Carrier-recovery modules $330_1$ and $330_2$ perform signal processing that is generally directed at (i) compensating the frequency mismatch between the carrier frequencies of optical LO signal 220 and return optical signal 244 and/or (ii) reducing the effects of phase noise. Frequency mismatch between the carrier frequencies of optical LO signal 220 and return optical signal 244 may be present, e.g., when at least a portion of return optical signal 244 is generated within optical link 130 due to a non-linear optical process, such as Raman scattering or Brillouin scattering. Various signal-processing techniques that can be used to implement the frequency-mismatch-compensation processing in carrier-recovery modules $330_1$ and $330_2$ are disclosed, e.g., in U.S. Pat. Nos. 7,747,177 and 8,073,345, both of which are incorporated herein by reference in their entirety. Example signal-processing techniques that can be used to implement phase-error-correction processing in carrier-recovery modules $330_1$ and $330_2$ are disclosed, e.g., in U.S. Pat. No. 9,112,614, which is incorporated herein by reference in its entirety.

Digital signals $332_X$ and $332_Y$ generated by carrier-recovery modules $330_1$ and $330_2$, respectively, are applied to a correlation-function module 340. Module 340 operates to compute correlation functions $F_X(\tau)$ and $F_Y(\tau)$ that quantify correlation between a respective one of digital signals $332_X$ and $332_Y$ and a respective source signal 338, as a function of relative delay time $\tau$. In an example embodiment, source signal 338 is a copy of the sequence of constellation symbols that was used by optical transmitter 210 in the process of generating modulated optical signal 230 that caused optical receiver 290 to receive the return optical signal 244 that is currently being processed.

Depending on the operating mode, module 340 may receive source signal 338 either by way of data bus 250 from transmitter DSP 212 or by way of data bus 292 from memory 294 (also see FIG. 2). A configurable bus selector 336 serves to connect module 340 to the appropriate one of data buses 250 and 292. The configuration of bus selector 336 depends on the logic state of a control signal MODE, which is de-asserted (e.g., "low") in the normal operating mode and asserted (e.g., "high") in the OLM operating mode. As a result, bus selector 336 causes module 340 to receive source signal 338 from transmitter DSP 212 in the normal operating mode and from memory 294 in the OLM operating mode. A person of ordinary skill in the art will understand that module 340 can receive and use different respective source signals 338 for computing the respective correlation functions corresponding to digital signals $332_X$ and $332_Y$, e.g., because different respective sequences of constellation symbols may have been used by optical transmitter 210 in the process of generating the corresponding X-polarized modulated optical signal $226_X$ and Y-polarized modulated optical signal $226_Y$.

After the computations of correlation functions $F_X(\tau)$ and $F_Y(\tau)$ are completed, module 340 outputs the computed correlation functions by way of digital signals $342_X$ and $342_Y$, respectively. Digital signals $342_X$ and $342_Y$ are applied to an output interface 350 that transfers the corresponding data, by way of control signal $138_i$, to OLM controller 140 (also see FIG. 1). A person of ordinary skill in the art will understand that correlation functions $F_X(\tau)$ and $F_Y(\tau)$ provide estimates of the impulse response of optical link 130 to a probe-light pulse having the X-polarization and the Y-polarization, respectively.

FIG. 4 shows a block diagram of an optical transport network 400 according to an embodiment. As shown, optical transport network 400 includes four instances (nominal copies) of node 100 (FIG. 1), which are labeled $100_1$-$100_4$. Optical transport network 400 also includes a network controller 410 that controls and coordinates OLM functions of nodes $100_1$-$100_4$ and collects OLM data therefrom by way of control signals $142_1$-$142_4$. Optical fibers $130_1$-$130_4$, which are connected to nodes $100_1$-$100_4$, respectively, are all laid to pass through a common fiber conduit (e.g., a fiber-optic cable) 420, a schematic enlarged cross-sectional view of which is shown in FIG. 4. In some embodiments, fiber conduit 420 may have additional optical fibers (not explicitly shown in FIG. 4).

In operation, node $100_1$ applies to optical fiber $130_1$ a WDM optical signal $430_1$ that travels through fiber conduit 420 from the West end to the East end thereof. Node $100_2$ similarly applies to optical fiber $130_2$ a WDM optical signal $430_2$ that travels through fiber conduit 420 from the West end to the East end thereof. Node $100_3$ applies to optical fiber $130_3$ a WDM optical signal $430_3$ that travels through fiber conduit 420 from the East end to the West end thereof. Node $100_4$ similarly applies to optical fiber $130_4$ a WDM optical signal $430_4$ that travels through fiber conduit 420 from the East end to the West end thereof.

In an example embodiment, WDM optical signals $430_1$-$430_4$ may have 96, 88, 92, and 80 carrier wavelengths, respectively. Each of these carrier wavelengths can potentially be used to perform OTDR measurements, e.g., as explained above in reference to FIGS. 1-3. As a result, the condition of fiber conduit 420 in optical network 400 can in effect be monitored using 356 independent OTDR sensors. Taken together, these 356 OTDR sensors can be used to provide to network controller 410 a relatively large volume of real-time OLM data. Network controller 410 can process or mine this volume of real-time OLM data to extract therefrom various qualitative and quantitative characteristics of the defects and/or imperfections that might be present in fiber conduit 420. A person of ordinary skill in the art will appreciate that the characteristics extracted in this manner may advantageously be more numerous, more detailed, more accurate, and/or more diverse than the characteristics that can be obtained using conventional OTDR methods due to one or more of the following features of the OTDR equipment used in optical transport network 400: (i) the OTDR measurements are performed in-band; (ii) the impulse responses can be measured at multiple wavelengths; (iii) the impulse responses can be measured in a polarization-sensitive manner for each of the multiple wavelengths; (iv) a relatively large number, e.g., in the hundreds, of independent OTDR sensors can be used for the same fiber or fiber-optic cable; and (v) a technical capability to configure different subsets of the OTDR sensors for different respective types of measurements, e.g., using Rayleigh, Brillouin, and Raman scattering, respectively.

According to an example embodiment disclosed above in reference to FIGS. 1-4, provided is an apparatus comprising: a first transceiver (e.g., $108_1$, FIG. 1) configured to generate a first modulated optical signal (e.g., 230, for i=1, FIG. 2) by modulating a first carrier wave having a first carrier wavelength (e.g., $\lambda_1$, FIG. 1); a second transceiver (e.g., $108_2$, FIG. 1) configured to generate a second modulated optical signal (e.g., 230, for i=2, FIG. 2) by modulating a second carrier wave having a second carrier wavelength (e.g., $\lambda_2$, FIG. 1) different from the first carrier wavelength; and an optical multiplexer/demultiplexer (e.g., 118, FIG. 1) configured to multiplex the first modulated optical signal and the second modulated optical signal to generate a first WDM signal (e.g., $430_1$, FIG. 4); wherein the apparatus is configured to apply the first WDM signal to a first optical link (e.g., 130, FIG. 1) and receive back from the first optical link a second WDM signal produced therein due to at least one of (i) distributed reflection of the first WDM signal and (ii) distributed scattering of the first WDM signal; wherein the optical multiplexer/demultiplexer is further configured to: demultiplex the second WDM signal to generate a first return optical signal (e.g., 244, for i=1, FIG. 2) corresponding to the first modulated optical signal and a second return optical signal (e.g., 244, for i=2, FIG. 2) corresponding to the second modulated optical signal; apply the first return optical signal (e.g., by way of $110_1$, FIG. 1) to the first transceiver; and apply the second return optical signal (e.g., by way of $110_2$, FIG. 1) to the second transceiver; wherein the first transceiver is further configured to determine a first correlation function to quantify correlation between the first modulated optical signal and the first return optical signal; and wherein the second transceiver is further configured to determine a second correlation function to quantify correlation between the second modulated optical signal and the second return optical signal.

In some embodiments of the above apparatus, the apparatus further comprises a WDM transmitter (e.g., 120, FIG. 1) configured to transmit payload data (e.g., 102, FIG. 1) through the first optical link, the WDM transmitter including the first transceiver, the second transceiver, and the optical multiplexer/demultiplexer; and wherein each of the first transceiver and the second transceiver is configurable to transmit a respective portion (e.g., $106_1$, $106_2$, FIG. 1) of the payload data through the first optical link.

In some embodiments of any of the above apparatus, the first transceiver is configured to generate the first modulated optical signal to carry a first stream of payload data (e.g., $106_1$, FIG. 1) through the first optical link to a respective remote receiver.

In some embodiments of any of the above apparatus, the second transceiver is configured to generate the second modulated optical signal to carry a second stream of payload data (e.g., $106_2$, FIG. 1) through the first optical link to a respective remote receiver.

In some embodiments of any of the above apparatus, the second transceiver is configured to generate the second modulated optical signal to carry a fixed sequence of symbols (e.g., retrieved from 294, FIG. 2).

In some embodiments of any of the above apparatus, the first transceiver is configured to generate the first modulated optical signal to carry a first fixed sequence of symbols (e.g., retrieved from 294, FIG. 2).

In some embodiments of any of the above apparatus, the second transceiver is configured to generate the second modulated optical signal to carry a second fixed sequence of symbols (e.g., retrieved from 294, FIG. 2).

In some embodiments of any of the above apparatus, each of the first and second fixed sequences of symbols comprises a respective Golay sequence.

In some embodiments of any of the above apparatus, the apparatus further comprises an electronic optical-link-monitoring (OLM) controller (e.g., 140, FIG. 1) configured to receive (i) from the first transceiver (e.g., by way of 138₁, FIG. 1) a first set of OLM data corresponding to the first correlation function and (ii) from the second transceiver (e.g., by way of 138₂, FIG. 1) a second set of OLM data corresponding to the second correlation function.

In some embodiments of any of the above apparatus, the apparatus further comprises an electronic network controller (e.g., 410, FIG. 4) configured to receive from the electronic OLM controller (e.g., by way of 142, FIGS. 1, 4) the first and second sets of OLM data, and wherein the electronic network controller is operable to initiate an operations, administration, and management (OAM) action in response to the first and second sets of OLM data.

In some embodiments of any of the above apparatus, the first transceiver is further configured to: generate one or more first electrical signals (e.g., 268, for i=1, FIG. 2) by coherently detecting the first return optical signal using a split portion of the first carrier wave (e.g., 220, for i=1, FIG. 2) as an optical local oscillator; and determine the first correlation function using the one or more first electrical signals.

In some embodiments of any of the above apparatus, the second transceiver is further configured to: generate one or more second electrical signals (e.g., 268, for i=2, FIG. 2) by coherently detecting the second return optical signal using a split portion of the second carrier wavelength (e.g., received by way of 220, for i=2, FIG. 2) as an optical local oscillator; and determine the second correlation function using the one or more second electrical signals.

In some embodiments of any of the above apparatus, the first transceiver includes an optical filter (e.g., 246, FIG. 2) configured to filter the first return optical signal prior to the first return optical signal being coherently detected.

In some embodiments of any of the above apparatus, the optical filter is configured to: pass a spectral band corresponding to Brillouin scattering of the first modulated optical signal within the first optical link; and stop a spectral band corresponding to Rayleigh scattering of the first modulated optical signal within the first optical link.

In some embodiments of any of the above apparatus, the optical filter is configured to: pass a spectral band corresponding to Raman scattering of the first modulated optical signal within the first optical link; and stop a spectral band corresponding to Rayleigh scattering of the first modulated optical signal within the first optical link.

In some embodiments of any of the above apparatus, the first transceiver is configured to determine the first correlation function in response to the first return optical signal being produced within the first optical link by way of a first optical process from a set of optical processes consisting of distributed elastic reflection, Rayleigh scattering, Brillouin scattering, and Raman scattering; and wherein the second transceiver is configured to determine the second correlation function in response to the second return optical signal being produced within the first optical link by way of a different second optical process from said set of optical processes.

In some embodiments of any of the above apparatus, the apparatus further comprises one or more additional transceivers (e.g., 108ᵢ, where 2<i≤N, FIGS. 1, 2), each configured to generate a respective additional modulated optical signal by modulating a respective carrier wave having a respective carrier wavelength (e.g., $\lambda_i$, FIG. 1) that is different from the first carrier wavelength, the second carrier wavelength, and any respective carrier wavelength of any other additional transceiver; wherein the optical multiplexer/demultiplexer is further configured to: cause the first WDM signal to include one or more of the respective additional modulated optical signals; demultiplex the second WDM signal to generate one or more additional return optical signals (e.g., 244, for 2<i≤N, FIG. 2), each corresponding to the respective additional modulated optical signal; and apply each of the one or more additional return optical signals (e.g., by way of 110ᵢ, where 2<i≤N, FIG. 1) to the respective one of the one or more additional transceivers; and wherein each of the one or more additional transceivers is further configured to determine a respective correlation function to quantify correlation between the respective additional modulated optical signal and the respective additional return optical signal.

In some embodiments of any of the above apparatus, the apparatus further comprises a first network node (e.g., 100₁, FIG. 4), a second network node (e.g., 100₃, FIG. 4), and a fiber-optic cable (e.g., 420, FIG. 4); wherein the first network node includes the first transceiver, the second transceiver, and the optical multiplexer/demultiplexer; wherein the second network node includes a third transceiver (e.g., 108ᵢ in 100₃, FIGS. 1, 2, and 4) configured to generate a third modulated optical signal by modulating a third carrier wave having a respective carrier wavelength (e.g., $\lambda_i$, FIG. 2); wherein the second network node is configured to: generate a third WDM signal (e.g., 430₃, FIG. 4) that includes the third modulated optical signal as a WDM component thereof; apply the third WDM signal to a second optical link (e.g., 130₃, FIG. 4); receive back from the second optical link a fourth WDM signal produced therein due to at least one of (i) distributed reflection of the third WDM signal and (ii) distributed scattering of the third WDM signal; demultiplex the fourth WDM signal to generate a third return optical signal corresponding to the third modulated optical signal; and apply the third return optical signal to the third transceiver; wherein the third transceiver is further configured to determine a third correlation function to quantify correlation between the third modulated optical signal and the third return optical signal; and wherein the fiber-optic cable includes a first optical fiber and a second optical fiber, the first optical fiber being a part of the first optical link transmitting the first WDM signal, and the second optical fiber being a part of the second optical link transmitting the third WDM signal.

In some embodiments of any of the above apparatus, the first optical fiber is configured to guide the first WDM signal through the fiber-optic cable in a first direction (e.g., West-to-East, FIG. 4); and wherein the second optical fiber is configured to guide the third WDM signal through the fiber-optic cable in an opposite second direction (e.g., East-to-West, FIG. 4).

In some embodiments of any of the above apparatus, the first transceiver is configured to: generate the first modulated optical signal in a manner that causes the first modulated optical signal to have a first modulated component (e.g., $226_X$, FIG. 2) of a first polarization (e.g., X, FIG. 2) and a second modulated component (e.g., $226_Y$, FIG. 2) of a second polarization (e.g., Y, FIG. 2), the second modulated component being modulated independent of the first modulated component (e.g., using $224_X$ and $224_Y$, respectively; FIG. 2), the second polarization being orthogonal to the first polarization; and determine the first correlation function using a first sub-function (e.g., $F_X(\tau)$, FIG. 3) and a second sub-function (e.g., $F_Y(\tau)$, FIG. 3), the first sub-function quantifying correlation between the first modulated component and the first return optical signal, and the second sub-function quantifying correlation between the second modulated component and the first return optical signal.

According to another example embodiment disclosed above in reference to FIGS. 1-4, provided is an apparatus comprising: a first transceiver (e.g., $108_1$, FIG. 1) configured to generate a first modulated optical signal (e.g., 230, for i=1, FIG. 2) having a first carrier wavelength (e.g., $\lambda_1$, FIG. 1); a second transceiver (e.g., $108_2$, FIG. 1) configured to generate a second modulated optical signal (e.g., 230, for i=2, FIG. 2) having a different second carrier wavelength (e.g., $\lambda_2$, FIG. 1); and an optical multiplexer (e.g., 118, FIG. 1) configured to multiplex the first modulated optical signal and the second modulated optical signal to generate a first WDM signal (e.g., $430_1$, FIG. 4); wherein the apparatus is capable of transmitting the first WDM signal to a first optical link (e.g., 130, FIG. 1) and receiving back from the first optical link a second WDM signal; wherein the optical multiplexer is further configured to demultiplex the second WDM signal to generate a first return optical signal (e.g., 244, for i=1, FIG. 2) and a second return optical signal (e.g., 244, for i=2, FIG. 2); wherein the first transceiver is further configured to determine a first correlation, the first correlation being a correlation between the first modulated optical signal and the first return optical signal; and wherein the second transceiver is further configured to determine a second correlation, the second correlation being a correlation between the second modulated optical signal and the second return optical signal.

In some embodiments of the above apparatus, the apparatus further comprises a WDM transmitter (e.g., 120, FIG. 1) configured to transmit payload data (e.g., 102, FIG. 1) through the first optical link, the WDM transmitter including the first transceiver, the second transceiver, and the optical multiplexer; and wherein each of the first transceiver and the second transceiver is configurable to transmit a respective portion (e.g., $106_1$, $106_2$, FIG. 1) of the payload data through the first optical link.

In some embodiments of the above apparatus, the first transceiver is configured to generate the first modulated optical signal to carry a first stream of payload data (e.g., $106_1$, FIG. 1) through the first optical link to a respective remote receiver.

In some embodiments of the above apparatus, the second transceiver is configured to generate the second modulated optical signal to carry a second stream of payload data (e.g., $106_2$, FIG. 1) through the first optical link to a respective remote receiver.

In some embodiments of the above apparatus, the second transceiver is configured to generate the second modulated optical signal to carry a fixed sequence of symbols (e.g., retrieved from 294, FIG. 2).

In some embodiments of any of the above apparatus, the first transceiver is configured to generate the first modulated optical signal to carry a first fixed sequence of symbols (e.g., retrieved from 294, FIG. 2).

In some embodiments of any of the above apparatus, the second transceiver is configured to generate the second modulated optical signal to carry a second fixed sequence of symbols (e.g., retrieved from 294, FIG. 2).

In some embodiments of any of the above apparatus, each of the first and second fixed sequences of symbols comprises a respective Golay sequence.

In some embodiments of any of the above apparatus, the apparatus further comprises an electronic optical-link-monitoring (OLM) controller (e.g., 140, FIG. 1) configured to receive (i) from the first transceiver a first set of OLM data representing the first correlation and (ii) from the second transceiver a second set of OLM data representing the second correlation.

In some embodiments of any of the above apparatus, the apparatus further comprises an electronic network controller (e.g., 410, FIG. 4) configured to receive from the electronic OLM controller the first and second sets of OLM data, and wherein the electronic network controller is operable to initiate an operations, administration, and management (OAM) action in response to the first and second sets of OLM data.

In some embodiments of any of the above apparatus, the first transceiver is further configured to: generate the first modulated optical signal by modulating a first carrier wave having the first carrier wavelength; generate one or more first electrical signals (e.g., 268, for i=1, FIG. 2) by coherently detecting the first return optical signal using a split portion of the first carrier wave (e.g., 220, for i=1, FIG. 2) as an optical local oscillator; and determine the first correlation using the one or more first electrical signals.

In some embodiments of any of the above apparatus, the second transceiver is further configured to: generate the second modulated optical signal by modulating a second carrier wave having the different second carrier wavelength; generate one or more second electrical signals (e.g., 268, for i=2, FIG. 2) by coherently detecting the second return optical signal using a split portion of the second carrier wave as an optical local oscillator; and determine the second correlation using the one or more second electrical signals.

In some embodiments of any of the above apparatus, the first transceiver includes an optical filter (e.g., 246, FIG. 2) configured to filter the first return optical signal prior to the first return optical signal being coherently detected.

In some embodiments of any of the above apparatus, the optical filter is configured to: pass a spectral band corresponding to Brillouin scattering of the first modulated optical signal within the first optical link; and stop a spectral band corresponding to Rayleigh scattering of the first modulated optical signal within the first optical link.

In some embodiments of any of the above apparatus, the optical filter is configured to: pass a spectral band corresponding to Raman scattering of the first modulated optical signal within the first optical link; and stop a spectral band corresponding to Rayleigh scattering of the first modulated optical signal within the first optical link.

In some embodiments of any of the above apparatus, the first transceiver is configured to determine the first correlation in response to the first return optical signal being generated by way of a first optical process from a set of optical processes consisting of distributed elastic reflection within the first optical link, Rayleigh scattering within the first optical link, Brillouin scattering within the first optical link, and Raman scattering within the first optical link; and wherein the second transceiver is configured to determine the second correlation in response to the second return optical signal being generated by way of a different second optical process from said set of optical processes.

In some embodiments of any of the above apparatus, the apparatus further comprises one or more additional transceivers (e.g., $108_i$, where $2<i\leq N$, FIGS. 1, 2), each configured to generate a respective additional modulated optical signal having a respective carrier wavelength (e.g., $\lambda_i$, FIG. 1) that is different from the first carrier wavelength, the second carrier wavelength, and any respective carrier wavelength of any other additional transceiver; wherein the optical multiplexer is further configured to: cause the first WDM signal to include one or more of the respective additional modulated optical signals; and demultiplex the second WDM signal to generate one or more additional return optical signals; and wherein each of the one or more additional transceivers is further configured to determine a respective correlation between the respective additional modulated optical signal and the respective additional return optical signal.

In some embodiments of any of the above apparatus, the apparatus further comprises a first network node, a second network node, and a fiber-optic cable; wherein the first network node includes the first transceiver, the second transceiver, and the optical multiplexer; wherein the second network node includes a third transceiver configured to generate a third modulated optical signal having a respective carrier wavelength; wherein the second network node is configured to: generate a third WDM signal that includes the third modulated optical signal as a WDM component thereof; apply the third WDM signal to a second optical link; receive back from the second optical link a fourth WDM signal; and demultiplex the fourth WDM signal to generate a third return optical signal; wherein the third transceiver is further configured to determine a third correlation between the third modulated optical signal and the third return optical signal; and wherein the fiber-optic cable includes a first optical fiber and a second optical fiber, the first optical fiber being a part of the first optical link that transmits the first WDM signal, and the second optical fiber being a part of the second optical link that transmits the third WDM signal.

In some embodiments of any of the above apparatus, the first optical fiber is configured to guide the first WDM signal through the fiber-optic cable in a first direction; and wherein the second optical fiber is configured to guide the third WDM signal through the fiber-optic cable in an opposite second direction.

In some embodiments of any of the above apparatus, the first transceiver is configured to: generate the first modulated optical signal in a manner that causes the first modulated optical signal to have a first modulated component (e.g., $226_X$, FIG. 2) of a first polarization and a second modulated component (e.g., $226_Y$, FIG. 2) of a second polarization, the second modulated component being modulated independent of the first modulated component (e.g., using $224_X$ and $224_Y$, respectively; FIG. 2), the second polarization being orthogonal to the first polarization; and determine the first correlation using a first correlation function (e.g., $F_X(\tau)$, FIG. 3) and a second correlation function (e.g., $F_Y(\tau)$, FIG. 3), the first correlation function correlating the first modulated component and the first return optical signal, and the second correlation function correlating the second modulated component and the first return optical signal.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
   a first transceiver configured to generate a first modulated optical signal having a first carrier wavelength;
   a second transceiver configured to generate a second modulated optical signal having a different second carrier wavelength; and
   an optical multiplexer configured to multiplex the first modulated optical signal and the second modulated optical signal to generate a first WDM signal;
   wherein the apparatus is capable of transmitting the first WDM signal to a first optical link and receiving back from the first optical link a second WDM signal;
   wherein the optical multiplexer is further configured to demultiplex the second WDM signal to generate a first return optical signal and a second return optical signal;
   wherein the first transceiver is further configured to determine a first correlation between the first modulated optical signal and the first return optical signal;
   wherein the second transceiver is further configured to determine a second correlation between the second modulated optical signal and the second return optical signal; and
   wherein the first transceiver is configured to:
      generate the first modulated optical signal in a manner that causes the first modulated optical signal to have a first modulated component of a first polarization and a second modulated component of a second polarization, the second modulated component being modulated independent of the first modulated component, the second polarization being orthogonal to the first polarization; and
      determine the first correlation using a first correlation function and a second correlation function, the first correlation function correlating the first modulated component and the first return optical signal, and the second correlation function correlating the second modulated component and the first return optical signal.

2. The apparatus of claim 1, further comprising a WDM transmitter configured to transmit payload data through the first optical link, the WDM transmitter including the first transceiver, the second transceiver, and the optical multiplexer; and
   wherein each of the first transceiver and the second transceiver is configurable to transmit a respective portion of the payload data through the first optical link.

3. The apparatus of claim 1, wherein the first transceiver is configured to generate the first modulated optical signal to carry a first stream of payload data through the first optical link to a respective remote receiver.

4. The apparatus of claim 3, wherein the second transceiver is configured to generate the second modulated optical signal to carry a second stream of payload data through the first optical link to a respective remote receiver.

5. The apparatus of claim 3, wherein the second transceiver is configured to generate the second modulated optical signal to carry a fixed sequence of symbols.

6. The apparatus of claim 1, wherein the first transceiver is configured to generate the first modulated optical signal to carry a first fixed sequence of symbols.

7. The apparatus of claim 6, wherein the second transceiver is configured to generate the second modulated optical signal to carry a second fixed sequence of symbols.

8. The apparatus of claim 7, wherein each of the first and second fixed sequences of symbols comprises a respective Golay sequence.

9. The apparatus of claim 1, further comprising an electronic optical-link-monitoring (OLM) controller configured to receive (i) from the first transceiver a first set of OLM data representing the first correlation and (ii) from the second transceiver a second set of OLM data representing the second correlation.

10. The apparatus of claim 9, further comprising an electronic network controller configured to receive from the electronic OLM controller the first and second sets of OLM data, and
    wherein the electronic network controller is operable to initiate an operations, administration, and management (OAM) action in response to the first and second sets of OLM data.

11. The apparatus of claim 1, wherein the first transceiver is further configured to:
    generate the first modulated optical signal by modulating a first carrier wave having the first carrier wavelength;
    generate one or more first electrical signals by coherently detecting the first return optical signal using a split portion of the first carrier wave as an optical local oscillator; and
    determine the first correlation using the one or more first electrical signals.

12. The apparatus of claim 11, wherein the second transceiver is further configured to:
    generate the second modulated optical signal by modulating a second carrier wave having the different second carrier wavelength;
    generate one or more second electrical signals by coherently detecting the second return optical signal using a split portion of the second carrier wave as an optical local oscillator; and
    determine the second correlation using the one or more second electrical signals.

13. The apparatus of claim 11, wherein the first transceiver includes an optical filter configured to filter the first return optical signal prior to the first return optical signal being coherently detected.

14. The apparatus of claim 13, wherein the optical filter is configured to:
    pass a spectral band corresponding to Brillouin scattering of the first modulated optical signal within the first optical link; and
    stop a spectral band corresponding to Rayleigh scattering of the first modulated optical signal within the first optical link.

15. The apparatus of claim 13, wherein the optical filter is configured to:
    pass a spectral band corresponding to Raman scattering of the first modulated optical signal within the first optical link; and
    stop a spectral band corresponding to Rayleigh scattering of the first modulated optical signal within the first optical link.

16. The apparatus of claim 1,
    wherein the first transceiver is configured to determine the first correlation in response to the first return optical signal being generated by way of a first optical process from a set of optical processes consisting of distributed elastic reflection within the first optical link, Rayleigh scattering within the first optical link, Brillouin scattering within the first optical link, and Raman scattering within the first optical link; and
    wherein the second transceiver is configured to determine the second correlation in response to the second return optical signal being generated by way of a different second optical process from said set of optical processes.

17. The apparatus of claim 1, further comprising one or more additional transceivers, each configured to generate a respective additional modulated optical signal having a respective carrier wavelength that is different from the first carrier wavelength, the second carrier wavelength, and any respective carrier wavelength of any other additional transceiver;
wherein the optical multiplexer is further configured to:
cause the first WDM signal to include one or more of the respective additional modulated optical signals; and
demultiplex the second WDM signal to generate one or more additional return optical signals; and
wherein each of the one or more additional transceivers is further configured to determine a respective correlation between the respective additional modulated optical signal and the respective additional return optical signal.

18. The apparatus of claim 1, further comprising a first network node, a second network node, and a fiber-optic cable;
wherein the first network node includes the first transceiver, the second transceiver, and the optical multiplexer;
wherein the second network node includes a third transceiver configured to generate a third modulated optical signal having a respective carrier wavelength;
wherein the second network node is configured to:
generate a third WDM signal that includes the third modulated optical signal as a WDM component thereof;
apply the third WDM signal to a second optical link;
receive back from the second optical link a fourth WDM signal; and
demultiplex the fourth WDM signal to generate a third return optical signal;
wherein the third transceiver is further configured to determine a third correlation between the third modulated optical signal and the third return optical signal; and
wherein the fiber-optic cable includes a first optical fiber and a second optical fiber, the first optical fiber being a part of the first optical link that transmits the first WDM signal, and the second optical fiber being a part of the second optical link that transmits the third WDM signal.

19. The apparatus of claim 18,
wherein the first optical fiber is configured to guide the first WDM signal through the fiber-optic cable in a first direction; and
wherein the second optical fiber is configured to guide the third WDM signal through the fiber-optic cable in an opposite second direction.

20. An apparatus comprising:
a first transceiver configured to generate a first modulated optical signal having a first carrier wavelength;
a second transceiver configured to generate a second modulated optical signal having a different second carrier wavelength; and
an optical multiplexer configured to multiplex the first modulated optical signal and the second modulated optical signal to generate a first WDM signal;
wherein the apparatus is capable of transmitting the first WDM signal to a first optical link and receiving back from the first optical link a second WDM signal;
wherein the optical multiplexer is further configured to demultiplex the second WDM signal to generate a first return optical signal and a second return optical signal;
wherein the first transceiver is further configured to determine a first correlation between the first modulated optical signal and the first return optical signal;
wherein the second transceiver is further configured to determine a second correlation between the second modulated optical signal and the second return optical signal;
wherein the first transceiver is further configured to:
generate the first modulated optical signal by modulating a first carrier wave having the first carrier wavelength;
generate one or more first electrical signals by coherently detecting the first return optical signal using a split portion of the first carrier wave as an optical local oscillator; and
determine the first correlation using the one or more first electrical signals; and
wherein the second transceiver is further configured to:
generate the second modulated optical signal by modulating a second carrier wave having the different second carrier wavelength;
generate one or more second electrical signals by coherently detecting the second return optical signal using a split portion of the second carrier wave as an optical local oscillator; and
determine the second correlation using the one or more second electrical signals.

21. An apparatus comprising:
a first transceiver configured to generate a first modulated optical signal having a first carrier wavelength;
a second transceiver configured to generate a second modulated optical signal having a different second carrier wavelength; and
an optical multiplexer configured to multiplex the first modulated optical signal and the second modulated optical signal to generate a first WDM signal;
wherein the apparatus is capable of transmitting the first WDM signal to a first optical link and receiving back from the first optical link a second WDM signal;
wherein the optical multiplexer is further configured to demultiplex the second WDM signal to generate a first return optical signal and a second return optical signal;
wherein the first transceiver is further configured to determine a first correlation between the first modulated optical signal and the first return optical signal;
wherein the second transceiver is further configured to determine a second correlation between the second modulated optical signal and the second return optical signal;
wherein the first transceiver is further configured to:
generate the first modulated optical signal by modulating a first carrier wave having the first carrier wavelength;
generate one or more first electrical signals by coherently detecting the first return optical signal using a split portion of the first carrier wave as an optical local oscillator; and
determine the first correlation using the one or more first electrical signals; and wherein the first transceiver includes an optical filter configured to filter the first return optical signal prior to the first return optical signal being coherently detected.

22. The apparatus of claim 21, wherein the optical filter is configured to:
pass a spectral band corresponding to Brillouin scattering of the first modulated optical signal within the first optical link; and
stop a spectral band corresponding to Rayleigh scattering of the first modulated optical signal within the first optical link.

23. The apparatus of claim 21, wherein the optical filter is configured to:
pass a spectral band corresponding to Raman scattering of the first modulated optical signal within the first optical link; and
stop a spectral band corresponding to Rayleigh scattering of the first modulated optical signal within the first optical link.

24. An apparatus comprising:
a first transceiver configured to generate a first modulated optical signal having a first carrier wavelength;
a second transceiver configured to generate a second modulated optical signal having a different second carrier wavelength; and
an optical multiplexer configured to multiplex the first modulated optical signal and the second modulated optical signal to generate a first WDM signal;
wherein the apparatus is capable of transmitting the first WDM signal to a first optical link and receiving back from the first optical link a second WDM signal;
wherein the optical multiplexer is further configured to demultiplex the second WDM signal to generate a first return optical signal and a second return optical signal;
wherein the first transceiver is further configured to determine a first correlation between the first modulated optical signal and the first return optical signal;
wherein the second transceiver is further configured to determine a second correlation between the second modulated optical signal and the second return optical signal;
wherein the first transceiver is configured to determine the first correlation in response to the first return optical signal being generated by way of a first optical process from a set of optical processes consisting of distributed elastic reflection within the first optical link, Rayleigh scattering within the first optical link, Brillouin scattering within the first optical link, and Raman scattering within the first optical link; and
wherein the second transceiver is configured to determine the second correlation in response to the second return optical signal being generated by way of a different second optical process from said set of optical processes.

25. An apparatus comprising:
a first transceiver configured to generate a first modulated optical signal having a first carrier wavelength;
a second transceiver configured to generate a second modulated optical signal having a different second carrier wavelength; and
an optical multiplexer configured to multiplex the first modulated optical signal and the second modulated optical signal to generate a first WDM signal;
wherein the apparatus is capable of transmitting the first WDM signal to a first optical link and receiving back from the first optical link a second WDM signal;
wherein the optical multiplexer is further configured to demultiplex the second WDM signal to generate a first return optical signal and a second return optical signal;
wherein the first transceiver is further configured to determine a first correlation between the first modulated optical signal and the first return optical signal;
wherein the second transceiver is further configured to determine a second correlation between the second modulated optical signal and the second return optical signal;
wherein the apparatus further comprises one or more additional transceivers, each configured to generate a respective additional modulated optical signal having a respective carrier wavelength that is different from the first carrier wavelength, the second carrier wavelength, and any respective carrier wavelength of any other additional transceiver;
wherein the optical multiplexer is further configured to:
cause the first WDM signal to include one or more of the respective additional modulated optical signals; and
demultiplex the second WDM signal to generate one or more additional return optical signals; and
wherein each of the one or more additional transceivers is further configured to determine a respective correlation between the respective additional modulated optical signal and the respective additional return optical signal.

26. An apparatus comprising:
a first transceiver configured to generate a first modulated optical signal having a first carrier wavelength;
a second transceiver configured to generate a second modulated optical signal having a different second carrier wavelength; and
an optical multiplexer configured to multiplex the first modulated optical signal and the second modulated optical signal to generate a first WDM signal;
wherein the apparatus is capable of transmitting the first WDM signal to a first optical link and receiving back from the first optical link a second WDM signal;
wherein the optical multiplexer is further configured to demultiplex the second WDM signal to generate a first return optical signal and a second return optical signal;
wherein the first transceiver is further configured to determine a first correlation between the first modulated optical signal and the first return optical signal;
wherein the second transceiver is further configured to determine a second correlation between the second modulated optical signal and the second return optical signal;
wherein the apparatus further comprises a first network node, a second network node, and a fiber-optic cable;
wherein the first network node includes the first transceiver, the second transceiver, and the optical multiplexer;
wherein the second network node includes a third transceiver configured to generate a third modulated optical signal having a respective carrier wavelength;
wherein the second network node is configured to:
generate a third WDM signal that includes the third modulated optical signal as a WDM component thereof;
apply the third WDM signal to a second optical link;
receive back from the second optical link a fourth WDM signal; and
demultiplex the fourth WDM signal to generate a third return optical signal;

wherein the third transceiver is further configured to determine a third correlation between the third modulated optical signal and the third return optical signal; and wherein the fiber-optic cable includes a first optical fiber and a second optical fiber, the first optical fiber being a part of the first optical link that transmits the first WDM signal, and the second optical fiber being a part of the second optical link that transmits the third WDM signal.

27. The apparatus of claim 26, wherein the first optical fiber is configured to guide the first WDM signal through the fiber-optic cable in a first direction; and wherein the second optical fiber is configured to guide the third WDM signal through the fiber-optic cable in an opposite second direction.

* * * * *